Patented July 15, 1941

2,249,708

UNITED STATES PATENT OFFICE 2,249,708

METHOD OF OXIDATION OF PARAFFIN

Mildred M. Hicks-Bruun, Swarthmore, Pa., assignor to Sun Oil Company, Philadelphia, Pa., a corporation of New Jersey No Drawing. Application January 18, 1939, Serial No. 251,549

3 Claims. (Cl. 260—451)

The present invention relates to the oxidation of hydrocarbons and is particularly concerned with the catalytic oxidation of paraffin hydrocarbons to fatty acids, being particularly directed to a catalyst for use in such a process.

It is well known that when a hydrocarbon such as paraffin is subjected to the action of an oxidizing gas such as air at a slightly elevated temperature that the hydrocarbon will be oxidized with the formation of various organic acids. However when the oxidation is carried out under conditions which will prevent complete oxidation the reaction is very slow and much time is necessarily consumed to effect any substantial degree of oxidation. This is especially true of heavier hydrocarbons such as paraffin wax and other relatively heavy petroleum fractions. Consequently much work has been done to find a suitable catalyst which will shorten the time of reaction or lower the temperature of the reaction. While many catalysts have been suggested and used they have not been entirely satisfactory it often happening that a catalyst which is efficient in catalyzing the desired reaction of oxidation of the hydrocarbons to fatty acids and thereby decreasing either the time or temperature of reaction would at the same time encourage undesirable side reactions and thus cause the formation of a final product containing a large percentage of undesirable by-products and consequently having a lower value.

Among the difficulties encountered in the oxidation of paraffin to fatty acids is that during the reaction there are formed in addition to the desired fatty acids, undesirable by-products such as esters, lactones and various hydroxy acids, in the products; and also a small percent of aldehydic and ketonic acids. Besides the fact that these undesired by-products of the reaction impart an unpleasant odor to the product and are often unstable, they are generally formed in such an amount as to render the fatty acids unsuitable for many ordinary uses.

Although it is perhaps possible, it seems impractical at the present time to separate these by-products from the desired fatty acids. Therefore, if it is desired to oxidize paraffin into useable fatty acids, it is apparent that some method must be provided either to convert the hydroxy acids into fatty acids or into some other desirable or easily separated chemical derivatives while in the product itself, or better still, to avoid the formation of such undesirable by-products.

Numerous experiments in the oxidation of paraffin to fatty acids have shown that for every 10° C. rise in temperature a 250% increase in the rate of oxidation was effected. However, these same experiments have shown that high temperatures favor the production of the undesirable hydroxy acids and lactones. Therefore, when attempts are made to oxidize paraffin to fatty acids in the absence of a catalyst, when a temperature is used which is sufficiently high to obtain a satisfactory rate of oxidation, the amount of undesirable hydroxy acids and lactones which are formed is so great as to render resulting product valueless. It is, therefore, apparent that some means must be found whereby an economical rate of reaction may be obtained at a temperature sufficiently low so that these undesirable by-products are not formed in a prohibitive amount.

It is, therefore, an object of this invention to provide a method for the catalytic oxidation of paraffin which will materially reduce the time of contact or the reaction temperature of the reaction.

A further object of this invention is to provide a method for the catalytic oxidation of paraffin and which while accomplishing this desired result will also materially reduce the amount of undesirable by-products which are formed in the reaction.

A further object is to provide a catalyst suitable for effecting the above results.

Other further objects will be apparent as the present description progresses.

Briefly stated the present invention involves the use as a catalyst in the oxidation of paraffin to fatty acids, of an organic salt of cobalt. Such a salt is preferably one that is soluble or disperses in the substance being oxidized, since when the catalyst is soluble in paraffin or disperses in it, it affords ready contact with the oxidizing gas between paraffin. Among the cobalt salts which have been found to be particularly suitable may be listed the cobalt soaps such as the cobalt soap of any of the fatty acids either saturated or unsaturated such as cobalt stearate, palmitate, oleate and linoleate. In addition to the fatty acid soaps of cobalt any of the naphthenic acid soaps of cobalt, or cobalt naphthenates, may be used. It is unnecessary that a single cobalt salt or soap be used, but a mixture of various cobalt soaps may be used and in fact it is particularly advantageous to use the cobalt soaps of the fatty acids obtained by oxidation of paraffin, for instance, the cobalt salts of the fatty acids obtained according to the present invention.

In practicing the present invention the paraffin to be oxidized is mixed with the desired amount of cobalt soap or catalyst and is introduced into a reaction chamber where it is heated to the desired degree and an oxidizing gas preferably under pressure is passed through the charge. The amount of catalyst used need not be more than 1% of the charge and amounts as low as 0.4% have given results as satisfactory as higher amounts of catalysts up to 5% of the charge as far as the rate of oxidation is concerned. Furthermore, the lower percentages of catalysts seem to give a better ratio of fatty acids formed to esters and lactones.

If, however, the amount of catalyst should be reduced to very low values, such as 0.1 or 0.05% then a rate of oxidation is obtained which is about half of that obtained with 0.4 to 5% catalyst. It is therefore apparent that the preferred range of catalyst is from 0.4 to 1% of catalyst per volume of charge, since amounts less than the preferred range result in a decrease in the rate of oxidation and greater amounts are unnecessary since they do not materially affect the rate of oxidation. In addition it has been found when relatively large amounts of catalyst, greater than 1% of the charge, are used that trouble is at times encountered due to foaming during the early part of the run, whereas foaming does not occur if 1% or less of catalyst is used.

In the course of the experiments with catalysts of the present invention, it was found that the catalysts accelerated the rate of oxidation of paraffin which had already been slightly oxidized, more than that of the paraffin alone. Such pre-oxidized material could be had by maintaining for a short time a high initial temperature in the reaction chamber. After such initial or activation period at about 150° C., during which the saponification and acid numbers of the pre-oxidized material would reach values of about 25 to 30, and 15 to 18 respectively, the temperature could be lowered to 130° or even 110° C. without stopping the reaction. The object of such lowering of the temperature is to avoid the low yields and high ratios of saponification numbers to acid numbers which are obtained at the higher temperatures of oxidation.

The activity of the cobalt salts of organic acids as catalysts in the oxidation of paraffin wax is illustrated in the results of the experiments tabulated below. In these experiments the charge of paraffin being oxidized was maintained at a temperature of 110° C. and under a pressure of 80 pounds per square inch while air was passed through the charge at a rate of 1.1 liters per minute.

| Catalyst | Time in hours | Oxidation products | | Ratio of sap. No. to acid No. |
|---|---|---|---|---|
| | | Saponification No. | Acid No. | |
| None | 16 | 3.7 | 2.9 | 1.3 |
| | 40.5 | 5.8 | 4.7 | 1.2 |
| | 64 | 9.2 | 4.9 | 1.9 |
| | 90.5 | 27.7 | 14.7 | 1.9 |
| | 112 | 56.1 | 35.2 | 1.6 |
| Cobalt stearate | 22 | 260.5 | 146.8 | 1.8 |
| | 46 | 379.0 | 205.5 | 1.8 |
| Cobalt acetate | 22 | 251.0 | 137.0 | 1.8 |
| | 40 | 350.5 | 189.0 | 1.9 |
| Cobalt dihydroxy stearate | 18 | 168.5 | 96.5 | 1.8 |
| | 40.5 | 303.5 | 174.6 | 1.9 |
| Cobalt tartrate | 22 | 215.0 | 117.0 | 1.8 |
| | 44 | 388.0 | 201.0 | 1.9 |
| Cobalt benzoate | 19 | 225.5 | 133.0 | 1.7 |
| | 39.5 | 361.0 | 212.0 | 1.7 |

As stated hereinbefore, the ratio of saponification number to acid number may be improved by lowering the temperature of reaction. At the same time, due to the activity of the cobalt salts as catalysts, a high rate of reaction is obtained. The results of experiments tabulated below will illustrate this fact. In these experiments the conditions of reaction were the same as those for the experiments tabulated above except for temperature which is given below.

| Catalyst | Temp. of reaction | Time in hours | Oxidation products | | Ratio of sap. No. to acid No. |
|---|---|---|---|---|---|
| | °C. | | Saponification No. | Acid No. | |
| None | 110 | 40 | 3.7 | 2.9 | 1.3 |
| | | 64 | 9.2 | 4.9 | 1.9 |
| | | 90 | 27.7 | 14.7 | 1.9 |
| None | 100 | 48 | 0 | 0 | |
| Cobalt stearate | 110 | 22 | 260.5 | 146.8 | 1.8 |
| | | 46 | 379.0 | 205.5 | 1.8 |
| | 100 | 22 | 109.1 | 73.1 | 1.5 |
| | | 46 | 263.0 | 170.5 | 1.5 |

It is to be noted that no oxidation occurred in the absence of a catalyst at 100° C. while the rate of reaction in the presence of a catalyst was quite appreciable.

Since the present invention is directed primarily to catalysts for use in the oxidation of paraffin and other hydrocarbons, the temperatures given above should not be taken as limiting. The preferred range of temperature is 100° C. to 130° C. but lower temperatures (down to 80° C.) may be used, however, only with a great decrease in the rate of reaction, and higher temperatures (of the order of 150° C.) may also be used with a further great increase in the rate of reaction but with the sacrifice of a good ratio of saponification number to acid number. However, with other conditions remaining the same, it has been found that the use of catalyst of the present invention will result in both an improved rate of reaction and an improved saponification number to acid number ratio.

What I claim and desire to protect by Letters Patent is:

1. The method of oxidizing paraffin for the production of fatty acids which comprises mixing said paraffin to be oxidized with 0.4% to 5% of a cobalt salt of an organic acid, heating said mixture to a temperature substantially within the range of 80° C. to 130° C. and passing oxygen through said mixture while maintaining it within said temperature range to produce a product having a ratio of saponification number to acid number not greater than 1.9.

2. The method of oxidizing paraffin for the production of fatty acids which comprises mixing said paraffin to be oxidized with 0.4% to 5% of a cobalt salt of an organic acid, heating said mixture to a temperature of the order of 150° C., passing oxygen through said mixture, maintaining said mixture at said temperature until its acid number is substantially 18 and its saponification number is substantially 30, thereafter continuing to pass oxygen through said mixture while permitting its temperature to drop to within the range of 80° C. to 130° C. and maintaining the temperature within said last specified range to produce a product having a ratio of saponification number to acid number not greater than 1.9.

3. The method of oxidizing paraffin for the production of fatty acids which comprises mixing said paraffin to be oxidized with 0.4% to 5% of a cobalt salt of an organic acid, heating said mixture to a temperature of the order of 150° C., passing oxygen through said mixture, maintaining said mixture at said temperature until its acid number is substantially 18 and its saponification number is substantially 30, thereafter continuing to pass oxygen through said mixture while lowering its temperature to substantially 110° C. and maintaining said last specified temperature throughout the remainder of the reaction to produce a product having a ratio of saponification number to acid number not greater than 1.9.

MILDRED M. HICKS-BRUUN.